United States Patent [19]

McDaniel

[11] Patent Number: 4,937,300

[45] Date of Patent: Jun. 26, 1990

[54] CATALYST AND POLYMERIZATION OF OLEFINS

[75] Inventor: Max P. McDaniel, Bartlesville, Okla.

[73] Assignee: Phillips Petroleum Company, Bartlesville, Okla.

[21] Appl. No.: 374,792

[22] Filed: Jul. 3, 1989

Related U.S. Application Data

[62] Division of Ser. No. 64,373, Jun. 22, 1987, Pat. No. 4,855,271.

[51] Int. Cl.$^5$ .......................... C08F 4/64; C08F 10/00
[52] U.S. Cl. ..................... 526/125; 526/119; 526/124; 526/129; 526/352
[58] Field of Search ........................... 526/125, 124

[56] References Cited

U.S. PATENT DOCUMENTS

| | | | |
|---|---|---|---|
| 3,642,746 | 2/1972 | Kashiwa et al. | 526/125 |
| 3,787,384 | 1/1974 | Stevens | 260/88.2 |
| 3,993,588 | 11/1976 | Thukral | 252/429 |
| 4,071,674 | 1/1978 | Kashiwa et al. | 526/125 |
| 4,082,692 | 4/1978 | Goldie | 252/429 |
| 4,087,380 | 5/1978 | Hyde | 252/429 |
| 4,097,409 | 6/1978 | Speakman | 252/429 |
| 4,110,523 | 8/1978 | Schweier | 526/124 |
| 4,149,990 | 4/1979 | Giannini et al. | 252/429 B |
| 4,173,547 | 11/1979 | Graff | 252/429 |
| 4,175,170 | 11/1979 | Schweier et al. | 526/125 |
| 4,256,865 | 3/1981 | Hyde | 526/124 |
| 4,258,159 | 3/1981 | Bienfait | 526/125 |
| 4,302,565 | 11/1981 | Goeke | 526/88 |
| 4,347,158 | 8/1982 | Kaas et al. | 526/125 |
| 4,379,759 | 4/1983 | Goeke | 252/429 |
| 4,391,736 | 7/1983 | Capshew | 252/429 |
| 4,458,058 | 7/1984 | Dombro | 526/129 |
| 4,467,044 | 8/1984 | Band | 502/111 |
| 4,634,747 | 1/1987 | Best | 526/129 |

FOREIGN PATENT DOCUMENTS

| | | | |
|---|---|---|---|
| 2543219 | 4/1977 | Fed. Rep. of Germany | 526/124 |
| 1586071 | 3/1981 | United Kingdom | |

*Primary Examiner*—Edward J. Smith
*Attorney, Agent, or Firm*—Beverly M. Dollar

[57] ABSTRACT

A process for the polymerization of olefins comprises contacting at least one olefin with a catalyst prepared by impregnating a support with an aqueous solution of a magnesium compound, drying, treating the dried support with a chlorinating agent, then treating with alcohol, then treating with an etching agent capable of removing residual alcohol, then activating with a halide or haloalkoxide of Ti.

14 Claims, No Drawings

CATALYST AND POLYMERIZATION OF OLEFINS

CROSS-REFERENCE TO RELATED APPLICATIONS

This application is a division of application Ser. No. 064,373, filed Jun. 22, 1987, now U.S. Pat. No. 4,855,271.

BACKGROUND OF THE INVENTION

This invention relates to supported catalysts containing titanium and/or vanadium and magnesium. In one aspect this invention relates to catalysts useful for the polymerization of olefins.

The invention relates also to the polymerization of α-olefins having 2-8 carbon atoms, optionally together with an amount preferably not exceeding 20 mole % of one or more other α-olefins having 2-15 carbon atoms, using these catalysts.

A number of supported catalysts containing titanium and/or vanadium and magnesium are known, for example, U.S. Pat. No. 3,787,384 discloses one in which a support of silica, alumina or a mixture thereof is contacted with either a hydrocarbyl magnesium, a hydrocarbyl halogen magnesium, a hydrocarby aluminum, or a hydrocarbyl halogen aluminum compound, followed by an excess amount of a halogen compound of a transition metal, particularly titanium or vanadium.

Further U.S. Pat. No. 3,993,588 discloses preparing a catalyst component by contacting silica with a magnesium compound and by contacting the resulting component with a titanium and/or vanadium compound.

From U.S. Pat. No. 4,173,547 catalyst components are known wherein a support material is contacted with an aluminum halogen compound, an organomagnesium compound, and a tetravalent titanium compound and/or a compound of another transition metal of group IVB-VIB in its highest valence, in the order given.

U.S. Pat. Nos. 4,082,692; 4,087,380 and 4,256,865 disclose processes for preparing supported titanium and magnesium catalyst components involving the joint fluidization, in an inert gas stream and at a temperature of 150°-1000° C., of a silica support and a water-free magnesium halide or magnesium alkoxide compound, and the subsequent incorporation of a titanium compound in the product thus obtained.

With respect to each of the catalyst components noted above, the objective is to achieve the highest possible activity (i.e., the polymer yield per gram of active catalyst) as well as other suitable properties, particularly those regarding molecular weight distribution, particle size, and particle size distribution of the polymer powders obtained. Indeed, it is possible to achieve favorable polymer properties with these known catalyst components but their activity has proven to be substantially less than what was envisioned. It is additionally known (cf. R. Spitz et al., Eur. Pol. Journ., Vol. 15, pp. 441-444) that the activity of these catalysts strongly decreases during the copolymerization of ethylene with α-olefins having 3-10 carbon atoms, in particular hexene, and that during the copolymerization considerable amounts of polymer waxes are produced which cause serious problems by depositing on the reactor wall.

An object of the present invention is to provide a catalyst providing high activity in the polymerization of olefins as well as desirable catalyst particle size, and desirable molecular weight distribution, particle size, and particle size distribution of the polymer products obtained.

Another object of the invention is to provide a catalyst capable of improved 1-hexene incorporation in processes where 1-hexene is polymerized with ethylene.

SUMMARY OF THE INVENTION

In accordance with the present invention a catalyst is prepared by contacting a support comprising highly porous alumina containing a magnesium compound with an alcohol and subsequently with a halide, alkoxide, or haloalkoxide of titanium and/or vanadium.

In accordance with a preferred embodiment the highly porous support is contacted with an etching agent, that is a compound capable of removing at least part of the alcohol, before the support is contacted with the titanium or vanadium compound.

DETAILED DESCRIPTION OF THE INVENTION

The support for the catalyst of this invention is prepared from a highly porous alumina. The alumina preferably contains at least 90 weight percent alumina and most preferably at least 99 weight percent alumina. Generally, the alumina should have a mean particle diameter of at least about 20 micron and preferably at least 50 micron. If fine alumina is used, the particle size of the polymer will generally be smaller than if coarser alumina is used.

Aluminas having a mean particle diameter larger than 200 microns are generally not preferred because they tend to result in polymers which have bulk densities that are lower than generally desired. Also, it is generally preferred to use alumina particles which have a generally spherical shape.

According to one embodiment of this invention the porous supports which are used are advantageously subjected to a thermal treatment prior to the contacting of the supports with a magnesium compound. This treatment is carried out at a temperature of 100°-1000° C., preferably 300°-800° C. The temperature at which the support is heated is chosen below the temperature at which the support material starts to sinter to prevent a decrease of the pore volume and the specific area. It is preferred to conduct the treatment at atmospheric pressure and in an inert atmosphere although pressure and atmosphere conditions are not critical. The duration of the heat treatment is not critical and generally lasts between 1-24 hours.

The particle size distribution of the support generally does not affect the activity of the catalyst, but does affect the polymer, in particular the free flow properties thereof. A narrow support particle size distribution is therefore desirable, and will result in a correspondingly narrow particle size distribution of the polymer obtained.

In this catalyst system the alumina is considered to act more as a sponge than as a typical catalyst support where high surface areas are generally considered necessary for high activity. For this invention it is the porosity of the support rather than its surface area that has been found to be of most importance. The internal porosity can be defined as the ratio of the pore volume to the material weight and is determined on the basis of the technique of water adsorption to incipient wetness or by $N_2$ adsorption. For the present invention alumina having an internal porosity of at least 0.5 ml/gm are preferred.

The aluminas used within the scope of the invention generally have a specific area exceeding 50 m²/g, usually on the order of 150 to 500 m²/g. The specific areas are measured in accordance with the technique of Brunauer, Emmett and Teller using a standardized method such as the one described in British Standards 4359, Part 1 (1969).

Since organometallic compounds used herein as etching agents react with water, the support should be dry. However, drying at extreme temperatures is not required and may sometimes even be undersible, as small amounts of moisture often prove harmless and may even lead to heightened activity, as can easily be established by experiment. Water bound to the support, however, is most preferably completely removed.

The magnesium compound used in this process is suitably a magnesium oxide; hydroxide; hydroxychloride; salt; e.g. halide, carbonate, oxalate, acetate, or nitrate, or the like; alkyl; or an alkoxide, e.g. $Mg(EtO)_z$. The currently preferred magnesium compounds are magnesium halides, particularly commercially available anhydrous magnesium dichloride. It is, however, noted that it is not required that the magnesium dichloride by totally anhydrous. In some of catalyst systems, particularly desirable results have been obtained when the magnesium chloride contained as much as 2 moles of water per mole of magnesium with about 0.1 mole of water per mole of magnesium generally being its most desirable of the hydrated dihalides.

The alcohol used in treating the support is selected from the lower alcohols, for example the straight chain alcohols containing up to 12 carbon atoms, for example methanol, ethanol, normal propanol, isopropanol, and isobutanol. It is currently preferred to use alcohols containing 2 to 3 carbon atoms per molecule, especially ethanol and the propanols.

The magnesium and alcohol containing support can be prepared in any suitable manner. One technique would include heating a mixture of the magnesium compound and the alumina at a temperature in the range of 100° C. to 800° C. and then adding alcohol to the cooled support. This technique of adding the magnesium compound to the alumina is similar to that which U.S. Pat. No. 4,082,692 discloses for adding magnesium to silica. The only caveat for the present invention is however that when such a melting technique is used the temperature should be kept below those levels which could adversely affect the structure and thus the porosity of the alumina. If such a technique is employed, it may be advantageous to contact the support with a halogenating agent to convert at last a portion of the magnesium to magnesium dihalide. Even if the halogenation step is not employed, the magnesium-containing alumina can be contacted with alcohol to give the magnesium/alcohol containing support required by the present invention.

The currently preferred technique of treating the support involves impregnating the alumina with a solution of the magnesium compound.

The alumina can be impregnated with the magnesium compound in any suitable solvent. The particular solvent selected will of course vary depending upon the magnesium compound being employed. One convenient method involves solubilizing the magnesium compound with an alcohol of the type described above. It has also been found that acetonitrile can be used to solubilize magnesium chloride when a small amount of an alkanol, e.g. ethanol is also present. Another technique has involved solubilizing $MgCl_2$ in the solvent by adding a titanium tetraalkoxide, e.g. titanium tetraethoxide. It is further possible to employ aqueous solutions of magnesium compounds that are dissolved in water, however, the use of the water requires that additional care be taken to assure that the amount of water present be reduced to a level which will not adversely affect the activity of the catalyst.

In order to minimize reduction of the pore size of the alumina it is generally preferred that the amount of the magnesium compound containing solution be limited to no more than that necessary to result in incipient wetness of the alumina. Multiple impregnation can be used if one is not enough to produce the desired loading of magnesium. It is generally preferred to use amounts of solution that are well below that which would result in incipient wetness of the alumina.

The amount of magnesium impregnated in the alumina can vary over a wide range, however, typically it would be such that the magnesium if taken as present as dichloride would be equal to at least about 5 weight percent and no more than about 80 weight percent based on the weight of the magnesium-containing support and more preferably about 16 to about 25 weight percent.

After the desired amount of magnesium compound has been impregnated upon the alumina, the alumina is dried. The drying conditions are selected so as to minimize reduction in the porosity of the support. Typically, this involves heating the alumina in a temperature in the range of about 30° C. to about 800° C., more preferably about 100° C. to about 400° C. It is preferred to conduct the drying at atmospheric pressure and in an inert atmosphere although the pressure and atmosphere conditions are not critical. The duration of the drying is not critical and generally would be from about 1 to about 24 hours. The degree of drying required and the time needed can be readily determined by routine experimentation.

When the alcohol solution has been added before the drying it has been found that the drying conditions affect the amount of alcohol in the alumina. Accordingly, in those cases, it is generally preferred to add a limited known amount of alcohol to the alumina after the drying step, particularly if a drying temperature higher than about 100° C. is employed.

That same technique of applying the alcohol can be employed when the magnesium compound has been added to the support in a melted state rather than by impregnation from a solution.

The amount of alcohol required to be present in the dried alumina catalyst support can vary depending upon the particular alcohol chosen and upon the results desired. Typically the molar ratio of the alcohol to the magnesium would be in the range of about 0.25/1 to 6/1 more preferably about 1/1 to about 4/1.

It is postulated that the effect of the alcohol is to swell the magnesium compound so that when the support is contacted with a material which will etch out the alcohol there is an increase in the surface area of the magnesium compound available for interaction with the titanium or vanadium compound.

Although the above-mentioned titanium and vanadium compounds can be employed to achieve the desired etching, it has been found desirable to employ limited amounts of other etching agents prior to the use of titanium or vanadium compound.

The etching agent used to remove alcohol from the support can thus be selected from any suitable compound which does not have any significant adverse effect upon the activity of the final catalyst. Some typical examples include the halides of titanium, vanadium, silicon, and sulfur; magala; and alkyl aluminum compounds, particularly those alkyl aluminum compounds having less than 4 carbon atoms in each alkyl radical. Some specifice examples of such compounds thus include $TiCl_4$, $Ti(OEt)Cl_3$, $VCl_4$, diethylaluminum chloride, $SiCl_4$, $HSiCl_3$, $SOCl_2$, triethylaluminum, and magala which comprises diethyl magnesium.

If the etching agent is a liquid it can simply be contacted with the magnesium-containing support. If the etching compound is not a liquid it can be employed in a suitable solvent. Solutions of the liquid etching agents can also be employed. Generally, the solvent can be any suitable liquid which does not have a significant adverse effect upon the catalyst activity.

The amount of etching agent can vary widely. Typically, however, the molar ratio of the etching agent to the alkanol will be in the range of 0.5/1 to 10/1.

The titanium and/or vanadium compounds that are used to provide the active transition metal for the catalyst are those well known in the art.

Examples of the titanium or vanadium compound are compounds of the formula $TiX_4$ wherein X is a halogen atom, compounds of the formula $Ti(OR)_{4-n}X_n$ wherein X is the same as defined above, R is an alkyl group, preferably those containing 1 to 12 carbon atoms, n is 0 or a postive number less than 4; compounds of the formula $VOX_3$, wherein X is the same as defined above, and compounds of the formula $VX_4$ wherein X is the same as defined above. The titanium compounds are preferred, and especially the compounds of the formula $TiX_4$, above all titanium tetrachloride, is preferred.

The solid catalyst obtained as described above is activated for use in polymerization with an organoaluminum compound, which is generally selected from the group of aluminum trialkyls, dialkylaluminum halides and alkylaluminum hydrides. Instead of alkyl groups, also one or more unsaturated hydrocarbon radicals can be bonded to the aluminum. Preferably, aluminum trialkyls are employed.

The catalysts of the invention can be used for the polymerization of ethylene, propylene, butylene, pentene, hexene, 4-methylpentene and other alphaalkenes having at least 3 carbon atoms, and also for mixtures thereof. They can also be used in the copolymerization of one or more α-olefins with polyunsaturated compounds. They are particularly suited to the polymerization of ethylene, optionally together with an amount preferably not exceeding 20 mole % of another α-olefin.

The polymerization can be carried out in a known way, for example by introducing the organoaluminum compound with which the catalyst is to be activated into a reactor containing the solvent. Next, the previously prepared catalyst is added, normally in such amounts that the amount of transition metal is 0.001–10 mmole per liter and preferably 0.01–1 mmole per liter. Then gaseous or liquid monomer is introduced. By using a mixture of monomers, copolymers can be prepared. During the polymerization, additional activating organoaluminum compound may be added, the addition being intermittent or continuous. Optionally, the activation prior to the polymerization can be dispensed with althogether so that activation occurs only during the polymerization. The polymerization is preferably carried out at temperatures below the melting point of the polymer, yielding a suspension.

As the solvent to be used during the preparation of the catalyst as well as for the polymerization, any liquid which is substantially inert relative to the catalyst system can be used. Examples are: one or a mixture of saturated linear or branched aliphatic hydrocarbons, including butanes, pentanes, hexanes, heptanes, and pentamethylheptane; mineral oil fractions such as low-boiling or normal gasoline or naphtha, kerosene, gas oil; aromatic hydrocarbons such as benzene or toluene; and halogenated aliphatic or aromatic hydrocarbons, for example tetrachloroethane. The polymerization can additionally be carried out in liquid monomer or in monomer in the supercritical fluid phase. It is preferred to use the aliphatic hydrocarbons or mixtures thereof, in polymerizations conducted on a technical scale due to economics.

The polymer suspension obtained during the polymerization can be worked up in a known manner, for example, with the catalyst being deactivated first, and the resulting catalyst residues being extracted with suitable solvents. The catalysts, however, are so active that the low concentration of catalyst residue in the resulting polymer may render a washing step unnecessary.

The polymerization can be carried out discontinuously or continuously, at atmospheric pressure or at elevated pressures up to 2000 kg/cm². By carrying out the polymerization under pressure, the polymer yield is enhanced, resulting in a polymer with a relatively low catalyst residue concentration. It is preferred to carry out the polymerization at pressures between 1–100 kg/cm², and particularly between 10–70 kg/cm².

The process of the invention lends itself to known modifications. The molecular weight, for example, can be controlled by adding hydrogen or other modifiers commonly used for the purpose. The polymerization can also be carried out in several stages arranged in parallel or in series, using different catalyst compositions, temperatures, residence times, pressures, hydrogen concentrations, etc., in each stage, if so desired. It is accordingly possible to prepare products, for example, which have such a wide molecular weight distribution that they have a high so-called flow index, by choosing in one stage conditions, e.g., pressure, temperature and hydrogen concentrations, which yield a polymer of high molecular weight, while choosing in another stage conditions which yield a product of lower molecular weight. For the preparation of polymers having a wide molecular weight distribution, the polymerization is advantageously carried out in two or more stages in which catalyst having different magnesium: transition-metal ratios are used.

With the catalysts of this invention, α-olefins can also be polymerized in the gas phase, i.e., in the absence of a solvent, in a known manner, for example according to the process described for a different catalyst composition of British Patent specification No. 1,343,982.

A further understanding of the present invention and its various objectives and advantages will be provided by referring to the following examples.

EXAMPLE I

A series of catalysts were prepared in which Ketjen B alumina, precalcined at 600° C. to remove water, was impregnated with $MgCl_2$ in ethanol to various loadings.

After impregnation most of the alcohol was evaporated away by placing the catalyst vessel in a hot oil bath at 120° C. while maintaining a stream of dry nitrogen for 15 minutes. In some cases, where incipient wetness was reached before the desired MgCl₂ loading has been reached, multiple impregnations were made where the catalyst was dried between each impregnation. After drying, the catalyst was treated with an excess of TiCl₄ in heptane and dried. The results of the use of these catalysts in polymerizations of ethylene is shown in Table I.

TABLE I

| Run # | Impregnated | Wt % MgCl₂ Found After Drying | Wt % Ti Absorbed | Activity g/g-30 m |
|---|---|---|---|---|
| 1 | 5 | 5.0% | 4.4% | 356 |
| 2 | 10% | 9.1% | 3.3% | 3,940 |
| 3 | 20% | 18.6% | 4.6% | 9,856 |
| 4 | 30% | 24.0% | 3.2% | 4,430 |
| 5 | 40% | 30.3% | 3.6% | 5,128 |

The starting alumina had a very uniform particle size (53–75 microns) and the polymer particles were also smooth, spherical, and uniform. Table I indicates that about 20% MgCl₂ is the best loading for this type of preparation. Apparently some chloride is lost during the drying step. This is shown in column 2 by the amount of chloride found on the catalyst after drying, expressed here for convenience as wt % MgCl₂. No doubt HCl was released during heating leaving an unknown composition containing ethoxide, oxide, or hydroxide, along with chloride. The amount of TiCl₄ adsorbed did not appear to depend upon the MgCl₂ loading; however, the MgCl₂ loading did have an effect upon the activity.

EXAMPLE II

Another series of catalysts were prepared using techniques similar to that used in preparing the catalyst of Example I but using various alcohols to dissolve the MgCl₂. The results of the use of the catalyst in polymerizing ethylene is summarized in Table II.

TABLE II

| Run # | Wt. % MgCl₂ Found | Alcohol | Activity g/g-30 m | Polymer Bulk Density | Wt % Ti |
|---|---|---|---|---|---|
| 6 | 20.6% | Propanol | 7920 | .35 | — |
| 7 | 18.6% | Ethanol | 9856 | | 4.6% |
| 8 | 20.0% | Methanol | 3437 | | 3.2% |
| 9 | 17.2% | Propanol | 8673 | | 2.5% |
| 10 | 23.1% | Ethanol | 8654/10 m | .41 | 6.7% |
| 11 | 20.0% | Ethanol | 7233/20 m | .42 | 2.8% |

Recipe=MgCl₂ in Alcohol impregnated onto Alumina, dried at 100° C., then treated with excess TiCl₄.

Ethanol and propanol appear to be equivalent, but methanol provided lower activity. The last two samples shown the variability that was sometimes found. This was probably due to variability in the efficiency of drying.

EXAMPLE III

Still another set of catalysts were prepared using techniques similar to that used in the preceding Examples but using different drying temperatures. The results obtained when these catalysts were used to polymerize ethylene are shown in Table III.

TABLE III

| Run # | Drying Temp. | Wt. % Ti Absorbed | Activity (g/g-30 m) |
|---|---|---|---|
| 12 | 100° C. | 5.6% | 9000 |
| 13 | 100° C. | 2.9% | 2588 |
| 14 | 150° C. | — | 327 |
| 15 | 200° C. | — | 803 |
| 16 | 300° C. | — | 314 |

Unlike previous samples, which were dried on a hot plate or in a rotovap, the catalysts of this example were dried in a nitrogen fluidized bed so that temperature could be accurately controlled. Notice that the activity drops off rapidly when the alcohol is removed at temperatures exceeding 100° C. This supports the view that a certain amount of residual alcohol is apparently necessary to achieve a swelling of the MgCl₂ will result in a more active catalyst.

EXAMPLE IV

In all the examples described thus far the alcohol in the dried alcohol and magnesium-containing alumina was at least partially removed by contact with TiCl₄. It was found that a number of other agents could be used for this purpose. This is demonstrated by the following Table which reports the results obtained with catalysts prepared by using various etching agents.

TABLE IV

| | | Etching Treatment | | | |
|---|---|---|---|---|---|
| Run # | Wt % MgCl₂ Found | Alcohol Solvent | Etching Reagent | Activity g/g-30 m | Wt % Ti Absorbed | Bulk Density |
| 17 | 20.6% | Propanol | TiCl₄ | 7920 | — | .35 |
| 18 | 20.6% | Propanol | Magala | 7716 | — | .34 |
| 19 | 20.6% | Propanol | TEA | 5392 | — | .36 |
| 20 | 14.1% | Ethanol | SiCl₄ | 7752 | 1.5% | — |
| 21 | Magala | Ethanol | SiCl₄ | 3340 | — | — |

In view of the activities obtained all reagents were suitable. In run 17 TiCl₄ alone was used. In the other run the named etching reagent was used and then the solid was contracted with TiCl₄. The catalyst of Run 21 used a support prepared from Magala rather than anhydrous MgCl₂. Although this catalyst was active it was not as desirable as the other catalysts.

EXAMPLE V

In this example a series of catalysts were prepared using either propanol or ethanol as the impregnation solvent and various etching techniques. The results obtained are summarized in Table V.

TABLE V

| Run # | Impreg. Solvent | Etching Treatment | TiCl₄ Treatment | Wt % Ti Adsorbed | Activity g/g-30 m |
|---|---|---|---|---|---|
| 22 | Propanol | None | Excess | 2.5% | 8673 |
| 23 | Propanol | 1 TEA | Excess | 2.5% | 6942 |
| 24 | Propanol | 2 TEA | Excess | 1.4% | 6011 |
| 25 | Propanol | 2 TEA | 1% Ti | 0.78% | 2970 |
| 26 | Propanol | 2 TEA | 2% Ti | 1.41% | 3280 |
| 27 | Propanol | 1 TEA | Excess | 1.01% | 10171 |
| 28 | Ethanol | 7 TEA | 1% Ti | 0.37% | 3226 |
| 29 | Ethanol | 7 TEA | 2% Ti | 1.7% | 406 |
| 30 | Ethanol | 7 TEA | Excess | 3.5% | 9617 |
| 31 | Ethanol | 7 TEA | Excess | 3.5% | 13490 |
| 32 | Ethanol | 7 TEA | Excess | 3.5% | 9784 |

Runs 27 and 31 shows that some of the most active catalysts are obtained by using a combination of TEA and excess TiCl$_4$.

EXAMPLE IV

In another series of catalyst preps, titanium ethoxide was also added to the magnesium dichloride/alcohol adduct solution. The amount used was about 0.5 moles Ti(OEt)$_4$ per mole MgCl$_2$. This permitted slightly more concentrated solutions to be made. After drying no etching treatmens other than TiCl$_4$ was used, but the drying temperature was varied. A summary of the results obtained in using this catalyst in the polymerization of ethylene are shown in Table VI.

TABLE VI

| Run # | Drying Temp. After Impreg. | Remaining Chloride mm/g or Wt % MgCl$_2$) | Activity g/g-30 m | Polymer Bulk Density |
|---|---|---|---|---|
| 33 | 80° C. | | 22.0% | 5,010 | .37 |
| 34 | 120° C. | | 22.0% | 10,700 | .34 |
| 35 | 200° C. | 3.94 | 19.0% | 5,100 | .35 |
| 36 | 700° C. | 1.26 | 6.0% | 587 | .40 |

Some advantage may be seen by adding titanium ethoxide. As before, overheating the catalyst seems to destroy its activity and remove much of the chloride. However, the decline in activity is less drastic than in Table III, and reasonable activity was still obtained after drying at as high as 200° C.

EXAMPLE VII

Other liquids were also tested for dissolving the MgCl$_2$. Acetone, for example, is quite polar, but did not dissolve the MgCl$_2$. Instead it only caused swelling of MgCl$_2$. Acetonitrile (MeCN) was also of interest since it is highly polar and can be obtained fairly dry. But it too behaved similarly. It swelled the MgCl$_2$ but did not dissolve it. A little ethanol added to the acetonitrile, however, caused rapid solvation. As little as 2 EtOH per MgCl$_2$ permitted acetonitrile to be used to form a concentrated solution (20 g per 100 ml solvent) which was stable at 25° C. Thus the combination of acetonitrile and a small amount of ethanol works better than either reagent alone.

Other similar combinations were also tried but with less success. For example zirconium butoxide would not substitute for the ethanol and ethanol could not be used with dichloromethane as the main solvent. In both cases no solution was formed. Neither would trimethyl phosphate (TMP) dissolve the MgCl$_2$ in acetonitrile. Two moles of ethoxyethanol per mole MgCl$_2$ did dissolve the MgCl$_2$ in acetonitrile, but the solution was too viscous to be used.

A series of catalysts were prepared using acetonitrile solutions containing traces of alcohol. In each case a solution of 20 g MgCl$_2$ in 100 ml of total solvent was impregnated into calcined (600° C.) Ketjen B alumina having a narrow particle size range (53–75 microns). Then the solvent was evaporated on a hot plate under nitrogen at around 100° C. (temperature not carefully controlled). The last step was to treat the dried alumina catalyst with TiCl$_4$ in heptane for 10–20 minutes at 60°–80° C., and rinse several times in heptane. The polymerization results obtained from such catalysts are summarized in Table VII.

TABLE VII

| Run # | Solvent | Alcohol | Wt % MgCl$_2$ | Activity |
|---|---|---|---|---|
| 37 | Acetone | 2 EtOH | 20% | 1800 |
| 38 | MeCN | 2 EtOH | 30% | 1830 |
| 39 | MeCN | 2 EtOH | 20% | 8650 |
| 40 | MeCN | 3 EtOH | 20% | 6417 |
| 41 | MeCN | 4 EtOH | 20% | 2744 |

The variability in activity in Table VII is attributed to the inability to precisely control the temperature when using a hot plate for the drying. The data shows that two moles of ethanol per mole of MgCl$_2$ is preferred.

EXAMPLE VIII

In order to test the effect of the drying and the alcohol content on the activity another series of catalysts were prepared. The MgCl$_2$ was first dried well at a high temperature. Then to undo the damage, a small but known amount of alcohol was added back to reswell the MgCl$_2$. Thus the amount of alcohol left on the catalyst is known and in principle very reproducible. Table VIII reports results obtained with a number of catalysts made by this swelling treatment, and the consistency has been greatly improved. Notice that the activity is no longer dependent on the drying temperature. The best swelling treatment in this procedure seems to be 3–4 EtOH per MgCl$_2$.

TABLE VIII

| Run # | Drying Temp. | Swelling Treatment | Etching Treatment | Wt % Ti Adsorbed | Activity g/g-30 m |
|---|---|---|---|---|---|
| 42 | 150° C. | 2 EtOH | TiCl$_4$ | 3.9% | 5360 |
| 43 | 300° C. | 2 EtOH | TiCl$_4$ | 2.4% | 5532 |
| 44 | 300° C. | 4 EtOH | TiCl$_4$ | 4.8% | 2767 |
| 45 | 150° C. | 0.5 Ti(OEt)$_4$ | TiCl | 2.0% | 1030 |
| 46 | 200° C. | 2 EtOH | 2 TEA | 2.2% | 5780 |
| 47 | 200° C. | 3 EtOH | 3 TEA | — | 11077 |
| 48 | 200° C. | 3 EtOH | 3 TEA | — | 11795 |
| 49 | 200° C.* | 3 EtOH | TiCl$_4$ | 5.2% | 6413 |
| 50 | 200° C. | 3 EtOH | MAGALA | 4.8% | 5911 |
| 51 | 200° C. | 3 iPrOH | 3 TEA | 4.4% | 5118 |
| 52 | 200° C. | 2 iPrOH | 2 TEA | 1.0% | 2849 |
| 53 | 200° C. | 4 EtOH | 4 TEA | 2.5% | 10650 |
| 54 | 200° C. | 3 tBuOH | 3 TEA | 2.4% | 3110 |
| 55 | 200° C. | 2 tBuOH | 2 TEA | 1.5% | 5263 |
| 56 | 200° C. | 1 tBuOH | 1 TEA | 3.2% | 2714 |

*= From here down catalysts made by impregnating MeCN solution of 4nPrOH/MgCl$_2$ onto alumina. Others made from 2EtOH/MgCl$_4$ in MeCN.

Run 45 reveals that titanium tetraethoxide is not as effective as alcohol in producing an active catalyst. A comparison of runs 47 and 48 with runs 42–44 shows that when swelling is conducted by adding alcohol to a well dried magnesium containing support one obtains a clearly superior support if one etches with triethyl aluminum before the TiCl$_4$ treatment.

EXAMPLE IX

Another series of catalyst were prepared using the best technique of the previous example but by varying the amount of MgCl$_2$ impregnated on the alumina. The results are summarized in Table IX.

TABLE IX

| Run # | MgCl$_2$ Loading | Activity (g/g-30 m) |
|---|---|---|
| 57 | 7.5% | 2168 |
| 58 | 17.1% | 11795 |
| 59 | 25.2% | 11077 |

TABLE IX-continued

| Run # | MgCl$_2$ Loading | Activity (g/g-30 m) |
|---|---|---|
| 60 | 34.2% | 10405 |

Recipe=2EtOH/MgCl$_2$ in MeCN, dry 200° C., swell w 3EtOH, Etch w 3TEA, TiCl$_4$.

The optimum loading for this particular prep was reached at or below 17% MgCl$_2$. Strangely, no further increase in activity was observed at higher loadings. It should be kept in mind that, although the loading is expressed as MgCl$_2$, in reality the magnesium is not present entirely as MgCl$_2$. After drying at 200° C., considerable chloride has been lost and the magnesium exists as a complex combination of chloride, oxide, hydroxide, ethoxide, and perhaps some interaction with the aluminate surface as well.

EXAMPLE X

In preparing another series of catalysts calcined Ketjen B alumina was impregnated with a concentrated aqueous solution of MgCl$_2$ to yield 16.7% loading, and then dried at various temperatures. In the first catalyst, where the drying temperature was 100°, the catalyst was slurried in heptane and exposed to 3 moles of ethanol at 25° C., as a swelling treatment. Then SiCl$_4$ was added to etch out ethanol, and finally the last treatment was with TiCl$_4$ to activate the catalyst. This produced an almost dead catalyst, probably 100° C. is not sufficient to remove most of the water from the MgCl$_2$. Therefore in preparing the next catalyst the same dried starting support was first treated with SiCl$_4$ to remove water, then with EtOH to swell the MgCl$_2$, and finally with TiCl$_4$ to etch and activate. This change nearly doubled the productivity. The next catalyst preps involved varying the drying temperature of the impregnated support, to remove more and more water, while the same sequence of treatments was maintained.

The results obtained with these catalysts are summarized in Table X.

TABLE X

Aqueous Prep.

| Run No. | Drying Temp. | Treatment Sequence | Activity g/g-30 m | Wt % Ti Adsorbed |
|---|---|---|---|---|
| 61 | 100° C. | EtOH-SiCl$_4$-TiCl$_4$ | 171 | |
| 62 | 100° C. | SiCl$_4$-EtOH-TiCl$_4$ | 285 | |
| 63 | 150° C. | SiCl$_4$-EtOH-TiCl$_4$ | 296 | |
| 64 | 200° C. | SiCl$_4$-EtOH-TiCl$_4$ | 108 | |
| 65 | 250° C. | SiCl$_4$-EtOH-TiCl$_4$ | 497 | |
| 66 | 300° C. | SiCl$_4$-EtOH-TiCl$_4$ | 3723/16 m | |
| 67 | 300° C. | SiCl$_4$-EtOH-TiC$_4$ | 4700 | 3.4 |
| 68 | 300° C. | SiCl$_4$-EtOH-TiCl$_4$ | 5875 | |
| 69 | 350° C. | SiCl$_4$-EtOH-TiCl$_4$ | 5393 | |
| 70 | 250° C. | SiCl$_4$-EtOH-TiCl$_4$ | 2700 | |
| 71 | 300° C. | SOCl$_4$-EtOH-TiCl$_4$ | 3794 | |
| 72 | 300° C. | EtOH-TiCl$_4$ | 3743 | |
| 73 | 300° C. | TiCl$_4$-TiCl$_4$ | 1488 | |

It will be noted that the activity soars when the drying temperature was raised above about 250° C. This was considered surprising since the effect of heating hydrous MgCl$_2$ at these higher temperatures is to decompose it rather than dehydrate it. At these temperatures chloride is partially replaced by a combination of oxide and hydroxide, and some interaction with alumina is also likely. In fact, calcining in nitrogen at 300° C. was found to remove 53% of the chloride on these catalysts. X-ray diffraction results on the calcined material indicated mainly the lines of gamma-alumina, from the support. A few other lines were also present. These were similar to MgO, but many expected from MgO were missing. No evidence for other species, such as MgCl$_2$ or MgOHCl were detected. Apparently this new material is also swelled by ethanol to form an effective catalyst much like MgCl$_2$.

The last three runs demonstrate the results obtained by dehydrating the magnesium-containing alumina and then following with treatment sequences not involving the use of Sicl$_4$. In run 71 the Sicl$_4$ treatment has been replaced by SOCl$_2$, a much stronger chlorinating agent, but activity is actually diminished a little. Also in run 72 the SiCl$_4$ is omitted, again with a loss in activity. So apparently SiCl$_4$ does have a promotional effect, although how it operates is still uncertain. In run 72 it is shown that the ethanol treatment is still definitely necessary in order to obtain optimum activity.

EXAMPLE XI

Still another series of catalysts were prepared using aqueous MgCl$_2$. The effect of the level of MgCl$_2$ and the effect of AlCl$_3$ added to the aqueous MgCl$_2$ solution were evaluated. The results are summarized in Table XI.

TABLE XI

| Run No. | Loading MgCl$_2$ | Loading AlCl$_3$ | Treatment Sequence | Activity g/g-30 m | Wt % Ti Adsorbed |
|---|---|---|---|---|---|
| 74 | 10% | 0 | SiCl$_4$-EtOH-TiCl$_4$ | 1725 | |
| 75 | 17% | 0 | same | 4700 | |
| 76 | 30% | 0 | same | 12370 | |
| 77 | 30% | 0 | same | 16260 | |
| 78 | 10% | 10% | SiCl$_4$-EtOH-TiCl$_4$ | 2561 | |
| 79 | 10% | 10% | EtOH-TiCl$_4$ | 1678 | |
| 80 | 10% | 10% | TiCl$_4$ | 1663 | |
| 81 | 20% | 0 | SiCl$_4$-EtOH-TiCl$_4$ | 6474 | 3.0% |
| 82 | 30% | 0 | SiCl$_4$-EtOH-TiCl$_4$ | 9672 | 4.2% |
| 83 | 50% | 0 | SiCl$_4$-EtOH-TiCl$_4$ | 8769 | 3.4% |
| 84 | 76% | 0 | SiCl$_4$-EtOH-TiCl$_4$ | 17169 | 5.1% |

The results show that the catalysts prepared using aqueous MgCl$_2$ do not appear to have the same type of optimum magnesium loading effect as was noted in catalysts prepared from organic solvents.

Also shown in Table XI are three runs made in which AlCl$_3$·6H$_2$O was also dissolved in the aqueous Mgcl$_2$ solution. Both chlorides decompose on calcining. The aluminum chloride would ordinarily go to AlOCl, but the presence of alumina may have an effect. The activity seems to have been improved by this addition. Notice within this series that SiCl$_4$ helps, but that ethaol has less effect than when MgCl$_2$ is used without the AlCl$_3$.

EXAMPLE XIII

Another series of catalysts were prepared on a larger scale, 5-10 pound batches using aqueous MgCl$_2$. A summary of the catalyst differences and the polymerization results are provided in Table XII.

TABLE XIII

| Run No. | Catalyst Type | Activity g/g-30 m |
|---|---|---|
| 85 | 30% on Uncalcined Ket. B Rotary Dried N$_2$ 300° C. | 3368 |
| 86 | 30% on Calcined Ket. B Rotary Dried, Air 300° C. | 16,530 |
| 87 | 30% on Calcined Ket. G Muffle Dried, Air 300° C. | 25,405 |
| 88 | 30% on Calcined Ket. G Muffle Dried, Air 300° C. | 18,000/10 m |

TABLE XIII-continued

| Run No. | Catalyst Type | Activity g/g-30 m |
|---|---|---|
| 89 | Same as 88 but treated with TEA after Ethanol | 17,970 |
| 90 | 20% on Calcined Ket. B Muffle Dried, Air 300° C. | 17,290/20 m |
| 91 | Same as above but treated with TEA after Ethanol | 24,000 |
| 92 | 20% on Calcined Ket. B | 14,018 |
| 93 | 20% on spherical silica | 4657 |
| 94 | 8% Mg as Acetate on Calcined Ket. B Air 300° C. | 2278 |

A comparison of Runs 85 and 86 shows that the alumina must be precalcined before impregnation. Run 86 shows that dry air can be used in the calcining in place of notrogen. This was in doubt because oxygen could held dechlorinate the catalyst. However, the activity actually seems to be improved by the change.

Runs 87–89 achieved an outstanding activity by substituting the more porous Ketjen G in place of Ketjen B. The particle size distribution from these catalysts, however, was less impressive than those prepared earlier. This is probably due to the fact that Ketjen G is a much finer catalyst, and no attempt was made to screen out the alumina fines before the catalyst was made.

Runs 90–92 using 20% $MgCl_2$ on 100–200 mesh Ketjen B produced an excellent particle size distribution. In fact, polymer bulk densities as high as 0.42 g/cc were obtained. One change was made in the recipe of this catalyst; the catalyst was given a final TEA treatment to reduce the $TiCl_3$.

The last two runs in Table XII were made to answer the question of whether any magnesium salt could be used or whether it had to be $MgCl_2$. In run 94 magnesium acetate was aqueously impregnated onto calcined Ketjen B alumina in an amount equivalent to 20% $MgCl_2$. Then it was calcined at 300° C. and given $SiCl_4$-EtOH-$TiCl_4$ sequence of treatments. Although inferior to $MgCl_2$, the activity is surprisingly high and it suggests that other magnesium salts might indeed work.

Run 93 employed a highly spherical silica having a pore volume of 2.4 cc/g. The shape and porosity of the silica lead to hope that it too would function as a support in this preparation. However, in actual fact the size of the polymer particles obtained with the silica catalyst were not as desirable as those obtained with the alumina based catlayst. Further, as Table XII illustrates the silica based catalyst was not nearly as active as an alumina based catalyst containing about the same That which is claimed is:

1. A process for the polymerization of olefins comprising
   contacting at least one olefin under suitable reaction conditions with a catalyst prepared by
   (a) impregnating a highly porous support comprising at least about 90 weight percent alumina and having an internal porosity of at least 0.5 ml/gm, wherein said support has been calcined at a temperature of more than 100° C. but less than 1000° C., with an aqueous solution of a magnesium compound selected from the group consisting of magnesium dichloride, magnesium dibromide, magnesium diiodide, magnesium nitrate and magnesium acetate to incipient wetness;
   (b) drying at a temperature of about 300° C. to 500° C.;
   (c) treating the dried support with a chlorinating agent selected from $SiCl_4$ and $SOCl_2$;
   (d) then treating said support with about 2 to about 5 moles of an alcohol per mole of magnesium;
   (e) then treating said support with an etching agent consisting essentially of a halide or organometallic compound capable of removing residual alcohol; and
   (f) then treating said support with a transition metal compound selected from halides and haloalkoxides of Ti.

2. A process according to claim 1 wherein said magnesium compound is magnesium dichloride.

3. A process according to claim 2 wherein said support is impregnated with about 5 to about 80 weight percent magnesium dichloride.

4. A process according to claim 1 wherein said alcohol is selected from the group consisting of ethanol, isopropanol, tert-butyl alcohol, and n-propanol.

5. A process according to claim 4 wherein said alcohol is ethanol.

6. A process according to claim 1 wherein the molar ratio of said etching agent to said alcohol is in the range of 0.5/1 to 10/1.

7. A process according to claim 6 wherein said etching agent is $SiCl_4$.

8. A process according to claim 6 wherein said etching agent is triethylaluminum and said transition metal compound is $TiCl_4$.

9. A process according to claim 1 wherein $TiCl_4$ is employed both as said etching agent and said transition metal compound.

10. A process according to claim 1 wherein said magnesium compound is magnesium acetate.

11. A process according to claim 1 which further comprises the addition of $AlCl_3$ to said aqueous solution of magnesium compound.

12. A process according to claim 1 wherein said at least one olefin is selected from the group consisting of ethylene, propylene, butylene, pentene, hexene, 4-methylpentene and other alphaalkenes having at least 3 carbon atoms.

13. A process according to claim 12 wherein said olefin is ethylene.

14. A process according to claim 12 wherein ethylene and 1-hexene are copolymerized.

* * * * *

UNITED STATES PATENT AND TRADEMARK OFFICE
CERTIFICATE OF CORRECTION

PATENT NO.  :  4,937,300
DATED       :  June 26, 1990
INVENTOR(S) :  Max P. McDaniel and Shirley J. Martin It is certified that error appears in the above-identified patent and that said Letters Patent is hereby corrected as shown below:

ON TITLE PAGE:  Item [75] The listing of inventors should include ---Shirley J. Martin Bartlesville, Okla.---.

Item [19] "McDaniel" should read --McDaniel et al--.

Signed and Sealed this

Tenth Day of September, 1991

Attest:

HARRY F. MANBECK, JR.

*Attesting Officer*  *Commissioner of Patents and Trademarks*